Oct. 11, 1960 E. LEONARD 2,955,821

STEPWISE TAPE TRANSPORT MECHANISM

Original Filed March 23, 1956 2 Sheets-Sheet 1

INVENTOR.
EUGENE LEONARD
BY
Charles C. Allyn
ATTORNEY

Oct. 11, 1960 E. LEONARD 2,955,821

STEPWISE TAPE TRANSPORT MECHANISM

Original Filed March 23, 1956 2 Sheets-Sheet 2

INVENTOR.
EUGENE LEONARD
BY Charles E. Allyn
ATTORNEY.

United States Patent Office 2,955,821

Patented Oct. 11, 1960

2,955,821

STEPWISE TAPE TRANSPORT MECHANISM

Eugene Leonard, Port Washington, N.Y., assignor, by mesne assignments, to Curtiss-Wright Corporation, Carlstadt, N.J., a corporation of Delaware Continuation of application Ser. No. 573,372, Mar. 23, 1956. This application Dec. 31, 1956, Ser. No. 631,723

2 Claims. (Cl. 226—32)

This invention relates to tape transport mechanisms in data processors and more particularly to mechanisms which transport tapes in a stepwise movement.

Tapes containing control or information indicia are often used in data processors. The tape is moved to a sensing station where a line of indicia is sensed causing the generation of control or information signals that are transmitted to the data processor. The transmission of the signals to the data processor causes the data processor to perform a step of a processing operation.

At the end of the processing step the tape is moved and a new line of indicia is sensed. The stepwise sequential sensing of lines of indicia on the tape which causes the transmission of signals to the data processor directs the data processor through a complete processing operation.

Since the time required to perform one processing step is usually different from the time required to perform others a uniform motion is rarely employed to transport the tape. Instead, whenever a processing step is completed an initiating signal is fed from the data processor to the transport mechanism to start the movement of tape so that the next line may be sensed. Upon receipt of the initiating signal the transport mechanism moves the tape.

The transport mechanism includes a stepper motor, that is a motor designed to move through a fraction of a revolution each time it receives a command pulsing signal to do so. Even the highest quality stepper motors are known to fail upon occasion to step or advance, upon receipt of a command pulse. This phenomenon is somewhat alike to "sticking" of relay contacts, that is failure of relay contacts to transfer upon change in energization state.

If the tape does not move because of such stepper motor response failure the same line of indicia is again sensed and the associated processing step is reperformed. The reperforming of the same processing step may cause a serious error in the overall processing operation.

It is therefore an object of the invention to provide an improved tape transport mechanism that prevents repetitive sensing of the same line of indicia on a tape.

To prevent the repetitive sensing of the same line of indicia detection circuitry may be employed which would halt the data processor and trigger an error indicator. Although such apparatus indicates to the operator that misstep has occurred, it is then necessary for the operator to restart the data processor and manually initiate the tape movement. Such operations which are caused by transient misstepping of the tape are usually time consuming and consequently slow down the processing time appreciably.

It is therefore another object of the invention to provide improved tape transport apparatus which automatically corrects the transient misstepping of the tape.

It is a further object of the invention to provide apparatus for moving a tape in a stepwise manner which upon failing to step the tape as directed automatically performs another stepping operation.

In accordance with the invention apparatus is provided in data processor for moving a tape in a stepwise or discontinuous manner. The apparatus includes a control means having a first and a second state. Means are provided for setting the control means into a first state. When the control means are in the first state a current generator generates a current waveform which causes a motor to rotate a fixed amount. The motor, in turn, causes a drive mechanism to move the tape a given distance.

The drive mechanism includes indicators which respond whenever the drive mechanism is activated. The controllable sensing of an indicator causes the control means to return to its second stable state and thus terminate the operation of the current generator. Therefore the termination of the operation is dependent on the sensing of an indicator. If an indicator senses failure of stepper motor advance, a second current waveform is fed to the motor and a second attempt is made to move the tape.

It should be noted that the apparatus of the invention permits the automatic reinitiation of a stepping operation when the first attempt to step the tape fails.

A feature of the invention is a novel current waveform generator which feeds current pulses to the windings of the motor.

Other objects, features and advantages become apparent from the following specification taken with the drawings wherein.

Figure 1:
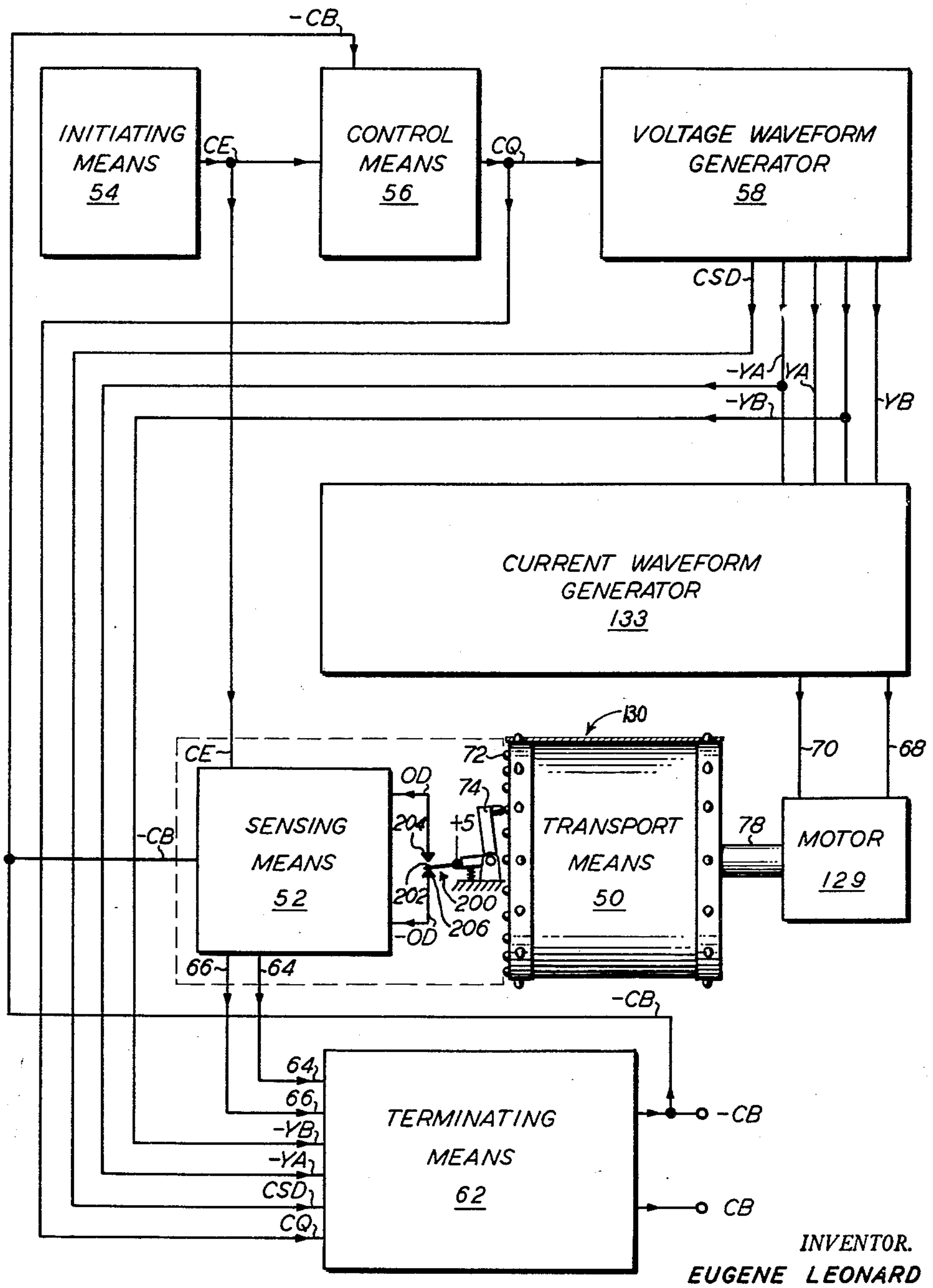
Fig. 1 is a block diagram of the apparatus showing the mechanical operation of the transport and sensing means in accordance with the invention.

In the drawings, signals are designated by alphabetical characters which may be assumed to be merely reference labels for purposes of the present invention. For brevity of description a signal and also the line carrying such signal will be identified by the associated alphabetical character. The physical significance of these alphabetical characters in a complete electronic digital computer, of which the apparatus of the present invention forms but a part, is explained for example in copending applications of Samuel Lubkin for "Electronic Calculator," Serial No. 567,566, filed February 26, 1956, now Patent No. 2,945,-213 of July 12, 1960 and of Evelyn Berezin for "Control Means with Record Sensing for an Electronic Calculator," Serial No. 567,567, also filed February 24, 1956, and assigned to the assignee of the present invention, and in my copending application for "Program Device," Serial No. 573,372, filed March 23, 1956 of which the present application is a continuation. The apparatus of the present invention may be, and in fact is fully incorporated in the computer of the Lubkin and Berezin disclosures, like-labeled signals in the three descriptions corresponding to one another. However, for brevity of disclosure the means for generating signals CE, —CS, CSD, MH and —MH encountered hereinafter are illustrated in simplified form. The apparatus of the present invention also utilizes recurrent synchronizing timing signals of the computer of the Lubkin patent. The timer for generating these signals is illustrated in Fig. 57 and the timing waveforms in Fig. 58 thereof. As shown therein, 44 pulse times constitute one timing cycle so that *t*44 of one cycle is *t*0 of the next cycle; quarter fractions of pulse times are the lowest units of significance, so that *t*44 (*t*0) is designated as *t*44-0/4. One pulse time is of microsecond order of magnitude. The timing signals utilized herein are —*t*44-1/4, *t*44-2/4, *t*3-3/4, —*t*4-1/4, —*t*41-1/4, occurring in the order named in a given cycle. It should be appreciated that the present invention may be utilized in conjunction with other computers or in conjunction with stepper motors in general.

Referring to Fig. 1 the apparatus of the invention is shown comprising a stepper motor 129 and thereby driven transport means 50, a sensing means 52, an initiating means 54, a control means 56, a voltage waveform generator 58, a terminating means 62, and a current waveform generator 133. These units are respectively illustrated in Figs. 47, 47, 45, 45, 45, 45 and 47 of the above cited Lubkin patent.

The initiating means 54 is basically a unit pulser, that is, a device which whenever activated transmits only one pulse. The control means 56 is a flip flop which has two stable states. When the control means 56 receives a signal via a set signal line CE the flip flop is triggered to its first stable state. When the control means 56 receives a signal via a reset signal line CB the flip flop is triggered to its second stable state.

The voltage waveform generator 58 is essentially a two-stage binary counter plus a delay circuit which functions to generate a specified sequence of voltage waveforms. These waveforms are fed via lines YA, —YA, YB, —YB to the current waveform generator 133. The current waveform generator 133 is primarily a current amplifier which converts voltage waveforms to high current waveforms suitable for driving the stepper motor 129.

The motor 129 is a multi-pole stepping motor which rotates one-forty-eighth of a complete revolution when it receives one period of the current waveform based on the YA and YB signals from the current waveform generator 133 via lines 68 and 70. The transport means 50 is primarily two sprocket wheels having teeth which enter sprocket holes of the tape 130 to be transported. On the side of one of the sprocket wheels is a circular array of 24 bosses 72.

The sensing means 52 is partially mechanical and partially electrical. It has a boss feeler 74 which rides over the bosses 72 to activate a double-throw switch 200 which, for each step of the transport means 50 alternates in transferring a positive voltage +5 volts from one to the other of two input terminals OD and —OD of the sensing means 52.

The presence of the voltage on a particular input terminal cooperates with a memory device (a flip flop) in the sensing means 52 to determine whether the transport means 50 has rotated. The terminating means 62 is basically a flip flop circuit which when activated feeds a signal —CB to the control means 56 and sensing means 52 to reset the flip flops therein.

The initiating means 54 is coupled via the CE signal line to a set input terminal of the control means 56 and via the same CE signal line to a priming input terminal of the sensing means 52. The control means 56 is connected to the voltage waveform generator 58 and to terminating means 62 by the CQ signal line. The voltage waveform generator 58 is also linked to the terminating means 62 by the —YA and the —YB signal lines.

The motor 129 is connected to the transport means 50 by the shaft 78. The transport means 50 is mechanically linked to the sensing means 52 by means of the mechanical contact of the bosses 72 and the boss feeler 74. The sensing means 52 supplies input signals to the terminating means 62 by means of the lines 64 and 66.

When the tape is to be stepped to a new position the initiating means 54 is activated. The initiating means 54 feeds the CE signal to the control means 56 and sets the flip flop therein to its first stable state. The CE signal is also fed to the sensing means 52 to prime the associated electrical circuitry therein. When the flip flop of the control means 56 is in its first stable state the CQ signal is generated and fed via the CQ signal line to the voltage waveform generator 58 and to the terminating means 62. In response, the terminating means 62 primes the terminating means 62 for the receipt of signals from the sensing means 52.

At the same time as the CQ signal is fed, voltage waveform generator 58 initiates the generation of, first, the YA and the —YA signals and then the YB and the —YB signals. These signals are fed via their associated signal lines to the current waveform generator 133. The current waveform generator 133 upon receipt of these signals generates current waveforms which are fed via the lines 68 and 70 to the motor 129.

The motor 129 attempts to rotate one forty-eighth of a complete revolution and move the tape forward by means of the transport means 50. If the motor 129 and therefore the transport means 50 rotate properly, the boss feeler 74 will change position and appropriate voltages will be generated in the sensing means 52. These voltages are compared with the presence or absence of a voltage generated by the memory circuit of the sensing means 52. Upon a proper comparison positive potentials are generated that are fed to the terminating means 62 via the lines 64 and 66. If positive potentials are present on both of these lines a —CB signal is generated by the terminating means 62. The —CB signal is fed to the sensing means 52 and to the control means 56 to cause the deactivation of these two units.

If, however, the rotation of the motor 129 and transport means 50 is not accomplished, the boss feeler 74 does not change position and the sensing means 52 does not transmit positive potentials along both the lines 64 and 66. Therefore, the —CB signal is not generated and the control means 56 is not deactivated. With the control means 56 still in an activated condition, the CQ signal is still being fed to the voltage waveform generator 58 and a new series of voltage waveforms are generated. This new series of voltage waveforms would again cause the attempted rotation of the transport means 50. This operation is repeated until the motor 129 and transport means do rotate.

Figure 2:
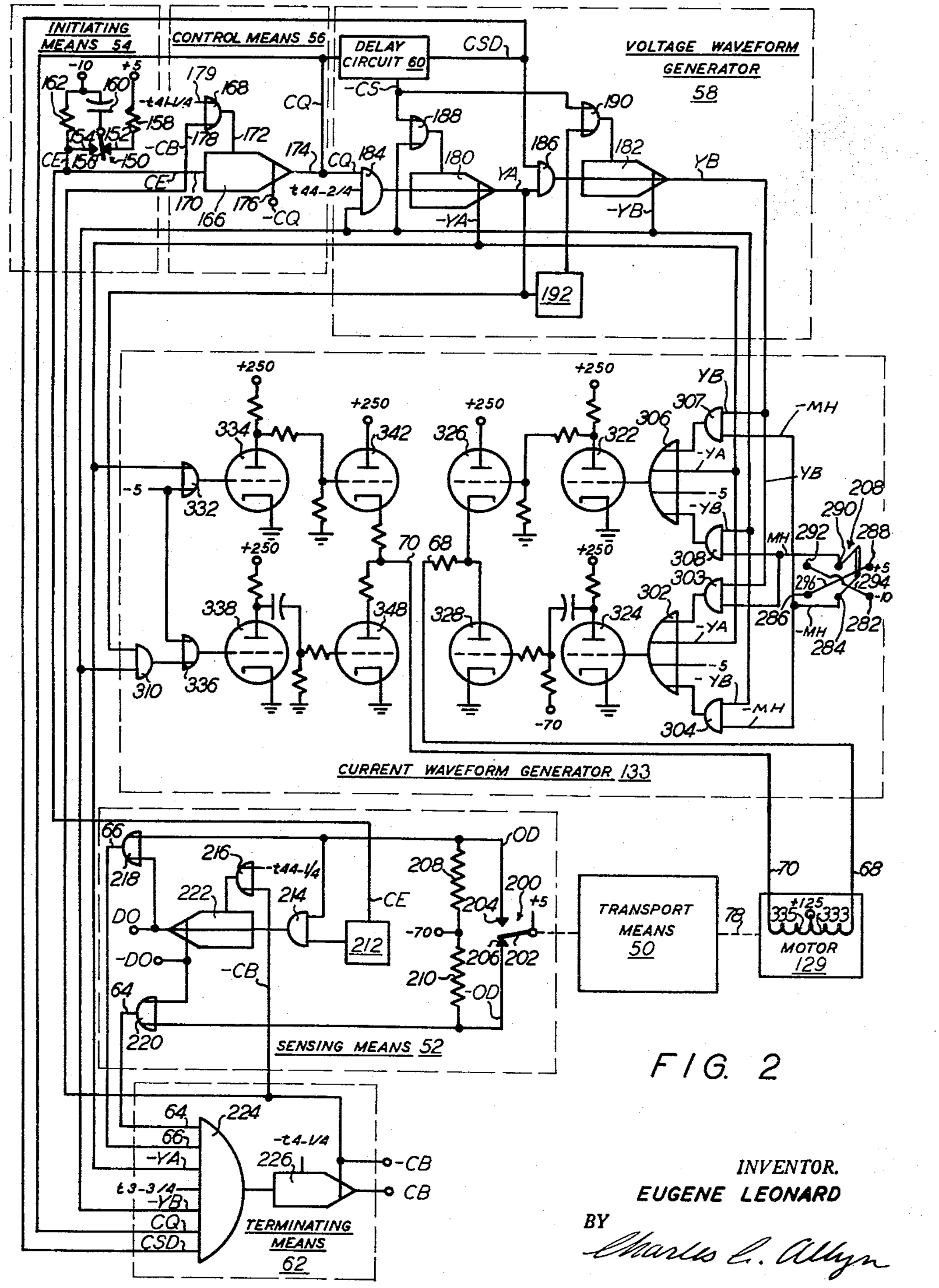
Fig. 2 is a diagram partially in schematic and partially in symbolic form of the block diagrams of Fig. 1.

Referring to Figure 2, the initiating means 54, as shown for simplified illustrative purposes, comprises the single pole double throw switch 150 having the fixed contacts 152 and 154 and moving contact 156. The fixed contact 152 is returned to a positive five volt potential via a resistor 158. The moving contact 156 is returned to a negative ten volts potential via the condenser 160. The fixed contact 154 is returned to the negative ten volts potential via a resistor 162. The outgoing CE signal line is also connected to the fixed contact 154.

The initiating means 54 operates as follows: The moving contact 156 is normally in contact with the fixed contact 152 causing the condenser 160 to be charged to a potential of plus five volts. When the initiating means is activated the moving contact moves to the fixed contact 154 and the condenser discharges through the resistor 162 causing a positive voltage transient or pulse CE to be fed to the CE signal line. The engagement of the contacts 154 and 156 is momentary, so that prior to the next CE signal contacts 152 and 156 are once more in engagement. Thus the CE signal is generated in the manner illustrated in Fig. 45 of the mentioned Lubkin patent, that is it occurs at $t$44-0/4 (equivalent to $t$0). Its occurrence initiates a series of 44 pulse time cycles during which the transport means 50 normally moves.

The control means 56 comprises the flip flop 166 and the "or" gate 168. The flip flop 166 is an electronic circuit having two stable states. Its symbolic representation signifies that it is a "reset dominant flip flop" as distinguished from the "set dominant" flip flop 180 encountered hereinafter, which has a distinguishing symbolic representation. The representations are consistent with those used in Figs. 34 and 35 of the Lubkin patent, which also illustrate the internal circuitry of the two flip flop types. Briefly stated here, the flip flop 166 has a set terminal 170, a reset terminal 172, a positive output terminal 174 and a negative output terminal 176. When the flip flop 166 receives the positive CE input pulse at its input terminal (the set terminal 170) the flip flop is triggered to its first stable state in which the positive output terminal 174 transmits the positive potential CQ and the negative output terminal 176 transmits the negative potential CQ. It remains in such state even when the positive input pulse is removed, unless and until it receives a negative input pulse via its reset terminal 172, whence it is triggered to its second stable state in which the positive output terminal 174 is at negative potential and the negative output terminal 176 is at positive potential. It remains in the second state, even if the negative input pulse is removed until once more a positive setting input pulse is applied. Upon simultaneous application or removal of both input pulses, the flip flop will remain in its second stable state; hence the designation "reset dominant." The positive output terminal 174 is coupled to the outgoing CQ signal line.

The "or" gate or buffer (illustrated in Fig. 26 of the Lubkin patent) 168 is a coincidence gate which passes the most positive potential present at its input terminals. It has a first input terminal 178 coupled to the —CB signal line and a second input terminal 179 coupled to a timing signal line —*t*41-1/4. Thus the flip flop 166 is reset at a pulse time *t*41-1/4 with the —CB signal then negative.

The voltage waveform generator 58 comprises the set-dominant flip flops 180 and 182, the "and" gates (illustrated in Fig. 25 of the Lubkin patent) 184 and 186, the buffers 188 and 190, the delay line (illustrated in Fig. 27 of the Lubkin patent) 192 and the delay circuit 60. The "and" gates 184 and 186 are coincidence gates which transmit the most negative potential present at their respective input terminals. The set-dominant flip flops 180 and 182 are similar to the previously described reset dominant flip flop 166, except in the following respect. When both the positive set input pulse and negative reset input pulse are simultaneously applied or removed, the flip flop will remain in its first stable state; hence the designation "set dominant." The buffers 188 and 190 are "or" gates similar to the previously described "or" gates. The delay line 192 is of the lumped parameter type which will transmit a signal from its output terminal a predetermined period of time after the receipt of the signal at its input terminal.

The output terminal of the gate 184 is coupled to the set terminal of the flip flop 180. The output terminal of the buffer 188 is connected to the reset terminal of the flip flop 180. The positive output terminal of the flip flop 180 is connected to the outgoing YA signal line and the negative output terminal is connected to the outgoing —YA signal line. The gate 186 has two input terminals. The first input terminal is coupled to a CSD signal line. The second input terminal is connected to the YA signal line. The output of the gate 186 is coupled to the set input terminal of the flip flop 182. The output terminal of the buffer 190 is coupled to the reset input terminal of the flip flop 182. The positive output terminal of the flip flop 182 is coupled to the YB signal line and the negative output terminal is coupled to the —YB signal line. The delay circuit 60 receives the CQ input signal and delivers the —CS and CSD output signals. It is a circuit which when primed by the CQ signal will for the duration thereof generate a series of pulse signals that are delayed from each other by times in the order of milliseconds, and therefore embrace many 44 pulse time periods. Very stable multi-vibrators may be employed. In the computer of the Lubkin patent, the delay circuit is illustrated in Fig. 40, there designated "Stepping Pulse Width Control 116*b*."

The voltage waveform generator 58 operates as follows: The positive potential CQ generated in response to the CE signal is passed to the delay circuit 60, activating it, and also to the "and" gate 184. At the time of generation of the CE signal, the potential of a second input signal line —YB to gate 184 is positive and remains positive for the time being. At *t*44-2/4 a positive synchronizing pulse is applied to a third input of gate 184. All inputs to the gate 184 being positive, it transmits a positive pulse which sets the flip flop 180 and a positive potential is transmitted via the YA signal line and a negative potential is transmitted via the —YA signal line. A predetermined period of time of the order of milliseconds (as determined by the delay circuit) after delay circuit 60 is primed by the positive CQ signal, a pulse of negative potential is generated on the normally positive —CS signal line which at this time has no effect since the positive potential on the —YB line holds flip flop 180 set. A short time thereafter a pulse of positive potential is transmitted via the CSD signal line to an input terminal of the "and" gate 186. Since the second input terminal of the "and" gate 186 is coupled to the YA signal line both input terminals of the gate 186 are at positive potentials. Therefore, a positive potential is fed through the gate 186 to set the flip flop 182 causing the generation of a positive potential on the YB signal line and a negative potential on the —YB signal line. At this time both the flip flops are set. After another period of time, a second pulse of negative potential is again present on the —CS signal line. This negative potential pulse and the negative potential on the —YB line acting through the buffer 188 cause the resetting of the flip flop 180, rendering the potential of lines YA and —YA negative and positive, respectively. The now negative YA potential is passed through delay line 192 to buffer 190. As yet flip flop 182 does not reset, since the other —CS input to buffer 190 is presently positive. After a time delay equal to the previous time delay a pulse of negative potential is again present on the —CS signal line. This negative potential pulse and the delayed negative potential on the YA line is transmitted through the buffer 190 causing the reset of the flip flop 182.

To summarize, initially the presence of the positive potential on the CQ signal line causes the setting of the flip flop 180. The first pair of signals out of the delay circuit 60 then cause the setting of the flip flop 182. The second pair of signals out of the delay circuit 60 causes the resetting of the flip flop 180. The third pair of signals from the delay circuit 60 then causes the resetting of the flip flop 182. Thus, it is seen that the flip flops 180 and 182 act as modified binary counters.

The sensing means 52 comprises the switch 200 having a moving contact 202 and the fixed contacts 204 and 206, the resistors 208 and 210, the delay line 212, the "and" gate 214, the buffers 216, 218 and 220, and the set-dominant flip flop 222.

The moving contact 202 of the switch 200 is returned to a positive five volts potential. The moving contact 202 is mechanically coupled to the boss feeler 74 (see Figure 1) which controls the movement of this contact. The fixed contact 204 is coupled to the outgoing OD signal line and the fixed contact 206 is coupled to the outgoing —OD signal line. The OD signal line is returned to a seventy volts negative potential via the resistor 208 and the —OD signal line is returned to the same potential via the resistor 210.

The input terminal of the delay line 212 is coupled to the incoming CE signal line. The output terminal of the delay line 212 is coupled to one input terminal of the gate 214. The second input terminal of the gate 214 is coupled to the incoming OD signal line. The output terminal of the gate 214 is coupled to the set terminal of the flip flop 222. The reset terminal of the flip flop 222 is coupled to the output terminal of the buffer 216.

The positive output terminal of the flip flop 222 is coupled to the DO signal line. The negative output terminal of the flip flop 222 is coupled to the —DO signal line. The first input terminal of the buffer 218 is coupled to the OD signal line and the second input terminal of the buffer 218 is coupled to the DO signal line. The output terminal of the buffer 218 is coupled to the terminating means 62 via the line 66. The first input terminal of the buffer 220 is coupled to the —DO signal lines and the second input terminal of the buffer 220 is coupled to the —OD signal line. The output terminal of the buffer 220 is coupled to the terminating means 62 via the line 64.

The first input terminal of the buffer 216 is coupled to the —CB signal line from the terminating means 62. The second input terminal of the buffer 216 is coupled to the —t44-1/4 signal line to provide synchronous resetting of the flip flop 222 when the apparatus is used with the computer disclosed in the above cited Lubkin patent. Thus the flip flop is reset at a time t44-1/4 with the —CB signal then negative. This occurs many 44 pulse time cycles subsequent to the initial cycle commencing with the generation of the CE signal, as will be seen hereinafter.

The sensing means 52 operates as follows: The CE signal is generated, signifying that the tape is to be moved. Such motion does not begin until the YA signal is generated subsequently, as will be seen hereinafter. Before such motion begins, the CE signal is fed through the delay line 212 to the gate 214. Assuming that the moving contact 202 is connected, prior to the tape movement, to the fixed contact 204, the OD signal line is at a positive potential and the flip flop 222 will be set. When the flip flop 222 is in a set condition, a positive potential is present on the DO signal line and a negative potential is present on the —DO signal line. The transport means subsequently rotates, and the moving contact 202 is transferred to the fixed contact 206. At this time the output terminal of the buffer 218 transmits a positive potential from the DO line and the output terminal of the buffer 220 also transmits a positive potential from the —OD line of +5 volts. These two positive potentials fed via the lines 66 and 64 to the terminating means 62 indicate that the transport means 50 has rotated. If because of "sticking" of the motor 129 the transport means had rotated then the moving contact 202 would not be transferred to the fixed contact 206 and the —OD signal line would be at a negative potential. This negative potential present at an input terminal of the buffer 220 in conjunction with the negative potential present on the —DO signal line feeding a second input terminal of the buffer 220 would cause the output of the buffer 220 to be at a negative potential. The occurrence of this negative potential is an indication that the transport means 50 had not rotated.

As will be seen hereinafter the terminating means 62 receives both of the previously cited positive potentials. In response thereto, and at a pulse time t3-3/4 occurring in a 44 pulse time period subsequent to the termination of tape rotation, the terminating means 62 generates a negative potential which is fed via the —CB signal line to an input terminal of the buffer 216. This negative potential cooperates with a negative potential from the —t44-1/4 signal line during the last-mentioned 44 pulse time period to cause the resetting of the flip flop 222.

The next time the tape is to be moved another pulse is fed via the CE signal line to the delay line 212 through the gate 214. Again the tape has not as yet moved. Since the moving contact 202 is as yet still connected to the fixed contact 206, the OD signal line is at a negative potential and the flip flop 222 will not be set. Therefore a positive potential exists on the —DO signal line and a negative potential exists on the DO signal line. As the transport means rotates the moving contact 202 is transferred to the fixed contact 204 and a positive potential of +5 volts is applied to the OD signal line. This positive potential is fed through the buffer 218 to the line 66, but does not set the flip flop, as the delayed CE signal had long ago terminated. At the same time the positive potential present on the —DO signal line is fed through the buffer 220 to the line 64. With the existence of a positive potential on both the lines 64 and 66 once again an indication is given that the transport means 50 has properly rotated. Again assuming failure of the motor 129 and transport means 50 to rotate, contact 202 would continue to engage contact 206, leaving the OD line negative. Since the DO signal is also negative, buffer 218, rather than buffer 220 in the previous example, transmits a negative potential. This similarly signifies that transport means 50 had not rotated.

The terminating means 62 comprises the seven-input "and" gate 224 and the reset dominant flip flop 226. A first input terminal of the "and" gate 224 is coupled to the 64 signal line, a second input terminal to the 66 signal line, a third input terminal to the —YA signal line, a fourth input terminal to a t3-3/4 timing signal line, a fifth input terminal to the —YB signal line, a sixth input terminal to the CQ signal line, and a seventh input terminal to the CSD signal line. The output terminal of the gate 224 is coupled to the set input terminal of the flip flop 226. The reset input terminal of the flip flop 226 is coupled to the —t4-1/4 signal line of the computer of the above cited application to provide a synchronized resetting of flip flop 226. The positive output terminal of the reset dominant flip flop 226 is coupled to the CB signal line and the negative output terminal to the —CB signal line. The description of the operation of the terminating means 62 will be deferred for prior consideration of the current waveform generator.

The current waveform generator 133 comprises the switch 208, the "and" gates 303, 304, 307, 308 and 310, the buffers 302, 306, 332 and 336, the voltage amplifiers 322, 324, 334 and 338, the current amplifiers 326, 328, 342 and 348 and their associated circuitry.

The switch 208 is a ganged double-pole double-throw switch having moving contacts 284 and 290 and fixed contacts 282, 286, 288 and 292. The fixed contacts 282 and 286 are associated with the moving contact 284. The fixed contacts 288 and 292 are associated with the moving contact 290. The fixed contacts 282 and 292 are connected by the jumper 294 and are returned to a negative ten volt potential. The fixed contacts 286 and 288 are connected together by the jumper 296 and are returned to a positive five volt potential. The moving contact 290 is coupled to the MH signal line. The moving contact 284 is coupled to the —MH signal line. Application of +5 volts to the MH line and of —10 volts to the —MH line connotes "presence" or "on-condition" of the MH and —MH signals. The reversed application of these voltages connotes their "absence" or "off-condition." It should be appreciated that the indicated representation of the switch 208 and generation of the MH and —MH signals is merely symbolical, for simplicity of disclosure. The circuit means for generating the MH and —MH signals for the computer of the Lubkin patent are illustrated in Fig. 50 thereof.

The YB and —MH signal lines are fed into the two input terminals of the gate 307. The —YB and MH signals are fed into the two input terminals of the gate 308. A buffer 306 is coupled to receive, as inputs, the output signals from the gates 307 and 308, the —YA signal and a minus five volt potential. The output of the buffer 306 is coupled to the control grid of the voltage amplifier 322, a conventional triode amplifier having a cathode that is coupled to ground and an anode that is coupled to a potential of plus two hundred and fifty volts through a resistance of 100 K ohms. The control grid of a vacuum tube 326 is coupled to ground through a 1 M ohm resistor and to the anode of the vacuum tube 322 through a 10 K ohm resistor. The anode of the vacuum tube 326 is coupled directly to a potential of two hundred and fifty volts.

The YB and MH signal lines are fed into the two input terminals of the gate 303; and the —YB and —MH signal lines are fed into the gate 304. The output signals from the gates 303 and 304, the —YA signal and a minus five volt potential are fed to four input terminals of the buffer 302. The output terminal of the buffer 302 is coupled to the control grid of the voltage amplifier 324. The voltage amplifier 324 is similar to the voltage amplifier 322. The anode of the voltage amplifier 324 is coupled to the control grid of the vacuum tube 328 through a condenser and resistor in series. The junction point of the condenser and resistor is coupled to a negative seventy volts potential through a 470 K ohms resistor. The cathode of the vacuum tube 328 is coupled directly to the ground and the anode of this tube is coupled to the cathode of the vacuum tube 326.

A —YA signal and a potential of minus five volts are fed into the buffer 332. The control grid of the voltage amplifier 334 is coupled to the output terminal of the buffer 332. The voltage amplifier 334 is similar to the voltage amplifier 322. The control grid of the vacuum tube 342 is coupled to ground through a 1 M ohm resistor and coupled to the anode of the vacuum tube 334 through a 10 K ohm resistor. The anode of the vacuum tube 342 is coupled directly to a positive two hundred and fifty volts potential.

The YA and —YB signal lines are fed to the two input terminals of the gate 310. A buffer 336 is coupled to receive at its input terminals the output signal from the gate 310 and a potential of minus five volts. The control grid of the voltage amplifier 338 is coupled to the output terminal of the buffer 336. The voltage amplifier 338 is similar to the voltage amplifier 322. The anode of the voltage amplifier 338 is also coupled to the control grid of the vacuum tube 348 through a condenser and resistor connected in series. The junction point of the series coupled condenser and resistor is connected to ground through a 470 K ohm resistor. The cathode of the vacuum tube 348 is coupled to ground and its anode is coupled to the cathode of the vacuum tube 342 through two fifty ohm resistors connected in series.

The motor 129 contains the stepping winding 333 and a holding winding 335. One end of the stepping winding 333 is connected to the anode of vacuum tube 328 through a 130 ohm resistor. One end of the holding winding 335 is coupled to the junction point of the two series coupled fifty ohm resistors. The other ends of the stepping winding and the holding winding are connected together and to a potential of plus one hundred twenty-five volts.

The stepping motor 129 is manufactured by The General Electric Company under Model Number 55MY54MB1. The vacuum tubes 348 and 326 may be considered to be normally conducting and the vacuum tubes 328 and 342 are normally cut off. Therefore the presence of a signal at the output terminal of the buffer 306 (a positive potential) will cause the vacuum tube 326 to stop conducting. The presence of a signal (a positive potential) at the output terminal of the buffer 302 will cause the vacuum tube 328 to conduct. The absence of a signal (no positive potential) at the output terminal of the buffer 332 will cause the vacuum tube 342 to conduct. The presence of a signal (a positive potential) at the output of the buffer 336 will stop the vacuum tube 348 from conducting.

In the operation of this unit, if the MH signal is not present the tape will move in a forward direction. The MH signal is either on or off depending upon the direction in which the tape is to move. The YA and YB signals are generated in the voltage waveform generator 58. These signals orient or step the motor 129 one-forty-eighth of a complete revolution.

The time occurrence of the YA and YB signals relative to each other during the stepping of the motor is as follows:

First the YA signal appears. Approximately ten milliseconds later the YB signal appears. Approximately ten milliseconds after the start of the YB signal the YA signal stops. Thus, the YA signal has a duration of about twenty milliseconds. Approximately ten milliseconds after the ending of the YA signal the YB signal stops. Thus, the YB signal has a duration of about twenty milliseconds. During the first ten millisecond period, or during the occurrence of the YA signal only, acceleration of the motor 129 occurs. During the second ten millisecond period, or during the simultaneous occurrence of the YA and the YB signals, deceleration of the motor occurs. During the third ten millisecond period, or during the occurrence of the YB signal only, the motor is brought to a stop.

The values of the electrical components are representative only, and are not meant as a limitation, it being understood that components having other values may be substituted for the components shown.

Under normal operating conditions the motor 129 will be stepped by the occurrence of a YA signal. However, it is possible that the motor 129 will not be stepped by the occurrence of a YA signal. Therefore, to prevent the generation of spurious results that can be caused by the non-movement of the motor in response to the YA signal, a sensing means 52 has been incorporated to sense the movement of the program stepping motor. If the motor does not step at the first occurrence of the YA and YB signals, these signals will be regenerated until the motor steps.

A switch 200 having a movable contact 202 and two fixed contacts 204 and 206 is activated by the movement of the transport means 50, as described above. Each step position of the transport means 50 causes the movable contact 202 to move up or down to contact the stationary contacts 204 or 206. Thus if the switch is initially in the position as shown, the movement of the transport means 50 will reorient the movable contact 202 to the up position to contact the stationary contact 204; and the next step position of the transport means 50 will orient the movable contact 202 to the down position to contact the stationary contact 206. The stationary contacts 204 and 206 are coupled respectively to the +OD and —OD signal lines.

The YA and YB signals that step the control belt 130 are generated in the voltage waveform generator 58 under the control of the presence of a CQ signal. The YA and YB signals will be continuously generated as long as the CQ signal is present. The CQ signal is initiated in the control means 56 by a CE signal. The CQ signal is terminated in the control means 56 by the generation of a —CB signal in the terminating means 62.

The —CB signal is generated at the termination of a cycle of YA and YB signals provided one of the two following conditions is satisfied after the motor 129 and transport means 50 have rotated:

(1) The flip flop 222 is set and therefore signal DO is positive and buffer 218 transmits positive potential to line 66; and the movable contact 202 of the switch 200 is in contact with the contact 206, and therefore the —OD line carries positive potential, and therefore buffer 220 transmits positive potential to line 64; or (2) The flip flop 222 is reset, and therefore signal —DO is positive and buffer 220 transmits positive potential to line 64; and the movable contact 202 is in contact with the stationary contact 204, and therefore the OD line carries positive potential, and the buffer 218 transmits positive potential to line 66.

To describe the sequence of events during operation it will be assumed that towards the end of a cycle of YA and YB signals when the transport means 50 is stopping at a new position, the flip flop 222 is in a set condition and the movable contact 202 is in contact with the stationary contact 206. The above first conditions are satisfied, and lines 64 and 66 will apply positive potentials to the gate 224 in the terminating means. The other inputs to the gate 224 will immediately or subsequently receive positive potentials. Thus the input lines —YA and —YB will carry positive potentials in view of the completion of the cycle of YA and YB signals. The CQ line will still continue to carry the positive potential it received at the time of the setting of flip flop 166 due to generation of the last previous CE signal. The input line CSD will receive a positive potential following the last preceding negative —CS signal, which had terminated the YB signal by resetting flip flop 182. Finally, at the next $t$3-3/4 the remaining, like-labeled input line will receive a positive synchronizing potential. The gate 224 transmits a positive setting potential to the flip flop 226. The —CB signal is generated. It is applied to the buffers 216 and 168 to prime them for resetting of the flip flops 222 and 166. Such resetting occurs at the next $t$41-1/4 with application of the $t$41-1/4 synchronizing pulse to the buffers 216 and 166. The DO signal terminates. Also the CQ signal terminates, and as a consequence the generation of the —CS and CSD signals terminates. Finally at the next $t$4-1/4 a reset pulse is applied to flip flop 226, terminating the —CB signal.

The computer of the above cited Lubkin patent now performs an operation designated by the new position of the tape in response to the termination of the CQ signal. At the end of the operation another CE signal which initiates a CQ signal is automatically generated by the computer. The CE signal fed to an input terminal of the gate 214 via delay line 212, attempts to set the flip flop 222; however the OD signal feeding a second input to the gate 214 is at a negative potential and a set pulse does not pass to the gate 214.

The CQ signal causes the generation of the YA and YB signals and the transport means 50 now starts stepping to a new position. In the course of stepping to the new position the movable contact 202 of the switch 200 is transferred from the stationary contact 206 to the stationary contact 204. Towards the end of this YA and YB signal cycle it is seen that the flip flop 222 is reset and the movable contact 202 is in contact with the stationary contact 204 to satisfy the second condition. The entire set of events is repeated, except that the flip flop 222 is not newly reset, having been reset initially. Thus, the —CB signal in the terminating means 62 is generated. The —CB signal terminates the CQ signal and the tape is at its new position. The computer then proceeds to perform the operation as directed by the tape. At the end of this operation another CE signal is automatically generated. The CE signal causes the generation of the CQ signal. The CE signal is also fed to an input terminal of the gate 214. Since the movable contact 202 is in contact with the stationary contact 204 the OD signal fed to the second input terminal of the gate 214 is positive and the flip flop 222 is set.

The CQ signal causes its usual generation of the YA and YB signals and the transport means 50 is stepped to a new position. During the stepping to the new position, the movable contact 202 transfers to contact the stationary contact 206. At the end of the YA and the YB signals it is seen that the flip flop 222 is set and the movable contact 202 of the switch 200 is in contact with the stationary contact 206 and the first condition for generating a —CB signal is once more satisfied. These operations will continue as the tape is stepped from one position to another position. If during one of the stepping operations the transport means 50 and therefore the tape does not move after the generation of the YA and the YB signals, it then becomes necessary to regenerate these signals.

The conditions in which the program stepping motor was not responsive to the YA and the YB signals will now be considered. It will be assumed that the movable contact 202 is in contact with the stationary contact 204 and a computer operation is being terminated. Therefore the CE signal is generated which initiates the CQ signal. The CE signal is also fed to the gate 214 to cause the flip flop 222 to set. The CQ signal causes the generation of the YA and YB signals but the motor 129 does not respond and therefore the transport means 50 does not move. Therefore, the movable contact 202 remains in contact with the stationary contact 204. At the end of the generation of the YA and YB signals, it is seen that the flip flop 222 remains set and the movable contact 202 remains in contact with the stationary contact 204. This arrangement of the position of the switch and the state of the flip flop 222 leaves line 66 at a positive potential and line 64 at a negative potential. This does not satisfy the first of the two conditions normally required at this stage to generate the —CB signal as the gate 224 is now unable to set flip flop 226, and incidentally also fails to satisfy the second condition. The —CB signal is therefore not generated and consequently the CQ signal is not terminated, nor is the flip flop 222 reset. The continued presence of the CQ signal prevents the performance of a new operation by the computer, including generation of the next CE signal. It thus prevents reperformance of the previous processing step. It causes the generation of the YA and YB signals for a second time. These signals again attempt to move the transport means 50. If the transport means 50 moves as a result of this attempt the first condition for generating the —CB signal will be satisfied and normal operation will again be initiated. Thus each time the YA and YB signals are generated the motor 129 will step one position. However, if the motor 129 does not cause a step when the YA and YB signals are generated, these signals will be regenerated until the motor 129 and transport means 50 are responsive.

It is readily seen that a similar regeneration of YA and YB signals will occur in the alternate set of circumstances of failure of response of the motor 129 and transport means 50. Here we begin with engagement of the contacts 202 and 206. This places positive potential on line 64. The CE signal cannot set flip flop 222; hence line 66 carries negative potential. The motor 129 should move at the termination of the first set of YA and YB signals; this would also place positive potential on line 66. This does not happen for failure of the motor to respond. Thus the second condition is violated, signal —CB is not generated, signals CQ, CSD, YA and YB go through a second cycle and repeated cycles until the motor responds. Again false reperformance of the previous instructions and false generation of the CE signal are prevented.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In a data processor controlled by signals from a moving tape, apparatus for reversibly moving said tape in a stepwise manner comprising a bi-stable electronic flip flop having a first and a second state and normally being in said second state, initiating means for switching said flip flop to said first stable state, electronic terminating means providing upon activation a pulse of predetermined duration effective to reset said flip flop to the second stable state, an electronic current waveform generator for generating a periodically recurring current waveform of current pulses of predetermined duration and pulse separations of predetermined duration, said current waveform generator operating when said flip flop is in said first stable state, a bidirectional stepper motor responsive to pulses generated by said current waveform generator, said motor rotating a predetermined fraction of a revolution for each pulse waveform from said current generator, means switchable to effect rotation of said motor in either direction, a tape transporting means coupled to said motor, said tape transporting means moving said tape, indicating means associated with said tape transporting means, said indicating means comprising a plurality of indicators corresponding in number to the number of steps per revolution of said motor, and sensing means cooperating with said indicators to reflect that said motor has rotated a fractional revolution step in either direction and including means responsive to such reflection for activating said terminating means, whereby upon failure of such reflection said motor continues to receive pulses from said current generator until such reflection occurs.

2. Apparatus according to claim 1, wherein the sensing means includes switching means transferable from a first switching state to a second switching state with each odd-numbered step movement of the aforesaid motor and transport means, and vice versa with each even-numbered step, in either direction, and voltage producing means responsive to said switching and initiating means to provide one combination of output potentials reflecting that the motor has stepped properly and other combinations of output potentials reflecting failure to step, the terminating means being activatable only upon receipt of said one combination of output potentials.

References Cited in the file of this patent

UNITED STATES PATENTS

| | | |
|---|---|---|
| 1,437,949 | Sherman et al. | Dec. 5, 1922 |
| 1,858,049 | Johnston | May 10, 1932 |
| 2,113,165 | Young | Apr. 5, 1938 |
| 2,212,653 | Steward | Aug. 27, 1940 |
| 2,787,464 | Davidson et al. | Apr. 2, 1957 |
| 2,791,422 | Baer | May 7, 1957 |